United States Patent

Trotter et al.

Patent Number: 5,387,349
Date of Patent: Feb. 7, 1995

[54] LIQUID PHASE REACTION PROCESS

[75] Inventors: Stuart G. Trotter; Ralph J. Doy, both of Cleveland, England

[73] Assignee: Imperial Chemical Industries plc, London, England

[21] Appl. No.: 966,900

[22] Filed: Oct. 26, 1992

[51] Int. Cl.[6] ................................................. C02F 1/20
[52] U.S. Cl. ................................... 210/750; 210/752; 210/756; 210/763; 423/DIG. 13
[58] Field of Search ..................... 210/762, 763, 198.1, 210/199, 205, 206, 750, 752, 756, 757; 422/190, 193, 211; 423/240, 497, 499, 586, DIG. 13

[56] References Cited

U.S. PATENT DOCUMENTS

| | | | |
|---|---|---|---|
| 2,112,335 | 3/1938 | Drennan | 422/190 |
| 3,072,465 | 1/1963 | Benichou et al. | 422/109 |
| 3,368,875 | 2/1968 | Tulleners | 422/190 |
| 3,615,252 | 10/1971 | DiPietro | 422/120 |
| 3,965,249 | 6/1976 | Kinosz | 210/754 |
| 4,462,903 | 7/1984 | Wettengl | 422/141 |
| 4,645,607 | 2/1987 | Divisek et al. | 210/763 |
| 4,879,047 | 1/1989 | Jackson | 210/763 |
| 4,963,341 | 10/1990 | Huxtable et al. | 423/499 |
| 5,039,429 | 8/1991 | Laundon et al. | 210/711 |
| 5,041,408 | 8/1991 | King et al. | 502/328 |

FOREIGN PATENT DOCUMENTS

| | | |
|---|---|---|
| 0069220 | 5/1982 | European Pat. Off. .......... 210/205 |
| 211530 | 2/1987 | European Pat. Off. . |
| 232853 | 8/1987 | European Pat. Off. . |
| 276044 | 7/1988 | European Pat. Off. . |
| 397342 | 11/1990 | European Pat. Off. . |
| 2172245 | 9/1973 | France . |
| 62-176592 | 8/1987 | Japan . |
| 309206 | 4/1929 | United Kingdom . |
| 491879 | 9/1938 | United Kingdom . |

Primary Examiner—Peter A. Hruskoci
Attorney, Agent, or Firm—Cushman Darby & Cushman

[57] ABSTRACT

A process wherein a liquid influent stream containing such an amount of a reactant that decomposition thereof to a desired concentration evolves, at the prevailing pressure and temperature, at least 0.5 volumes of gas per volume of the influent stream, is continuously passed through a volume of a particulate catalyst that is sufficient to decompose said reactant to said desired concentration and the evolved gas rises to the surface of said liquid and disengages therefrom into a gas space above said liquid, thereby providing an effluent stream having said desired concentration of said reactant. In order that back mixing of the effluent stream with said influent stream is avoided, the catalyst is disposed in a plurality of serially connected reaction volumes, each of which has a liquid surface from which evolved gas can disengage into the gas space, and the extent of reaction in each of said reaction volumes is limited by providing that the depth of catalyst in each reaction volume is such that the rate at which gas disengages from the liquid surface of each reaction volume is less than 0.05 $m^3.s^{-1}$ per $m^2$ of the liquid surface of that reaction volume.

9 Claims, 2 Drawing Sheets

LIQUID PHASE REACTION PROCESS

LIQUID PHASE REACTION PROCESS

This invention relates to a catalysed heterogeneous decomposition process, in which a reactant contained in a liquid stream is catalytically decomposed with the evolution of a gas, and to an apparatus in which such a process may be conducted. Such a process is of particular utility in the catalytic decomposition of hydrogen peroxide, and hypochlorite ions in aqueous solution.

BACKGROUND OF THE INVENTION

In U.S. Pat. No. 3,965,249 it is shown that hypochlorite ions may be decomposed to give gaseous oxygen by mixing a stream containing such ions with an unsupported catalyst. The combined stream containing both the catalyst and the hypochlorite ions is disclosed entering a tank. The combined stream flows through the tank, and exits from the tank as an effluent stream. The tank is shown to comprise a series of compartments separated by baffles such that the combined stream alternatively flows upwards and downwards within the tank.

In the process of the invention a liquid influent stream containing said reactant is continuously passed through a volume of a particulate catalyst that is sufficient to decompose said reactant to a desired concentration and the evolved gas rises to the surface of said liquid and disengages therefrom into a gas space above said liquid, thereby providing an effluent stream having said desired concentration of said reactant.

Where a gas rises through a liquid and disengages from the liquid at the surface of the liquid, it is possible that hydrodynamic instabilities are generated. The problems presented by these hydrodynamic instabilities are exacerbated by the presence of particulate solids, such as those present in a static bed of particulate catalyst. It is possible that a liquid may be prevented from flowing through a bed of particulate solids under the action of gravity due to these hydrodynamic instabilities.

Such hydraulic instability difficulties are liable to occur where the concentration of the reactant is such that decomposition of the reactant to the desired concentration would evolve large amounts of gas, for example more than 0.5 volumes of gas (at the pressure and temperature at which the decomposition is effected) per volume of liquid.

These hydrodynamic instability difficulties can be avoided by limiting the volume of gas that has to be disengaged from a given area of the liquid surface. Thus the process could be effected using a bed of catalyst of relatively large cross sectional area so that there is a large area of liquid surface above the catalyst bed from which the evolved gas can disengage. However the use of such relatively large cross section area catalyst beds is liable to give rise to the risk of back mixing of the effluent stream that has passed through the catalyst with the influent stream so that the concentration of the reactant in the effluent is not at the desired level.

SUMMARY

In the present invention this problem is overcome by disposing the volume of catalyst required to effect the decomposition of the reactant to the desired concentration in a plurality of serially connected reaction volumes, through which the liquid stream passes in series.

The term "reaction volume" herein refers to that volume within a reactor in which a reaction occurs. Each reaction volume is arranged to have a liquid surface at the top thereof from which the gas can disengage. The depth of catalyst in each reaction volume is limited so that the amount of gas evolved in each reaction volume, relative to the area of the liquid surface above that reaction volume is limited to an amount that will not give rise to the aforesaid hydraulic instabilities.

Accordingly the present invention provides a continuous process for the catalytic decomposition of a reactant that decomposes with the evolution of a gas, wherein a liquid influent stream containing said reactant is continuously passed through a volume of a particulate catalyst that is sufficient to decompose said reactant to a desired concentration and the evolved gas rises to the surface of said liquid and disengages therefrom into a gas space above said liquid, thereby providing an effluent stream having said desired concentration of said reactant, characterised in that said influent stream contains such an amount of said reactant that decomposition thereof to said desired concentration evolves, at the prevailing pressure and temperature, at least 0.5 volumes of gas per volume of the influent stream, and, in order that back mixing of the effluent stream with said influent stream is avoided, said catalyst is disposed in a plurality of serially connected reaction volumes, each of which has a liquid surface from which evolved gas can disengage into said gas space, and the extent of reaction in each of said reaction volumes is limited by providing that the depth of catalyst in each reaction volume is such that the rate at which gas disengages from the liquid surface of each reaction volume is less than 0.05 $m^3.s^{-1}$ per $m^2$ of the liquid surface of that reaction volume.

We further provide an apparatus for use in a continuous process for the catalytic decomposition of a reactant that decomposes with the evolution of a gas, comprising: (a) a reactor containing a quantity of catalyst for the decomposition of said reactant; (b) means to supply an influent liquid stream containing said reactant to said reactor; (c) outlet means for a liquid effluent stream containing a decreased concentration of said reactant; (d) means to establish a gas space above said liquid in said reactor, whereby gas evolved by decomposition of said reactant can rise through said liquid and disengage therefrom by passing into said gas space; and (e) outlet means for removing disengaged gas from said gas space; characterised in that means are provided to supply to said catalyst said influent stream at such a rate, in relation to the total volume of catalyst, that decomposition thereof by the catalyst evolves, at the prevailing pressure and temperature, at least 0.5 volumes of gas per volume of the influent stream, and said catalyst is disposed in a plurality of serially connected reaction volumes with static flow direction control means for directing said liquid stream through successive reaction volumes, each reaction volume being provided with level control means to establish a liquid surface at the top of each reaction volume from which said gas can disengage into said gas space and the depth of catalyst in each reaction volume is such that, when said influent liquid is supplied at said rate, the rate at which gas disengages from the liquid surface of each reaction volume is less than 0.05 $m^3.s^{-1}$ per $m^2$ of the liquid surface of that reaction volume.

DETAILED DESCRIPTION OF THE INVENTION

The liquid stream may comprise a reactant such as hydrogen peroxide in admixture with a diluent such as water. Alternatively, the liquid stream may comprise a reactant in solution, e.g. an aqueous solution of hypochlorite ions. Suitable particulate catalysts for use in the present invention for the decomposition of reactants such as hydrogen peroxide and hypochlorite ions are described in EP-A-211530, EP-A-276044, and EP-A-397342.

The passage of the liquid stream through the reactor is preferably under the action of gravity; the liquid stream may be fed into the reactor under the action of any suitable means, e.g. a pump, or gravity.

The space velocity of the liquid stream within the reactor, i.e. the volumetric flowrate of the liquid stream to the reactor divided by the total volume of catalyst, is preferably between 0.02 and 10 $hr^{-1}$, particularly between 0.1 to 5 $hr^{-1}$, and especially between 0.2 to 2 $hr^{-1}$.

Suitably the amount of catalyst employed is such that the aforesaid desired concentration of reactant in the effluent stream is less than 90%, preferably less than 75%, particularly less than 50%, and especially between 0 and 10% of the concentration in the influent stream.

Particular benefit is found in using the present invention when the concentration of the reactant in the influent stream is such that decomposition of the reactant to the desired concentration evolves at least 5, particularly at least 15, and especially 15 and 50, volumes of gas per volume of influent liquid stream.

The catalyst is preferably disposed in at least 4, and particularly at least 6, reaction volumes through which the liquid stream passes in succession.

Although the reaction volumes may be physically separated, a feature of the present invention is the ability to control the direction of the flow of the liquid stream between reaction volumes within a reactor. Such control is exercised by the use of suitable flow direction control means. Static flow direction control means are of particular utility, especially means such as baffles, for example forming under-weirs and over-weirs.

The gas evolved by the reaction is required to be satisfactorily disengaged from the liquid stream so that the aforementioned hydrodynamic instabilities are avoided and also it is desirable that entrainment of gas in the liquid stream passed to the succeeding reaction volume and/or to the effluent stream, is avoided. Satisfactory disengagement is to a large extent dependent on not exceeding a maximum voidage at the liquid surface from which the gas is to be disengaged. The voidage, i.e. the volume fraction of the gas, at the surface from which the gas is disengaging, is further dependent on the slip velocity, i.e. the difference in the vertical velocity components of the liquid stream and gas. For systems wherein the vertical velocity component of the liquid stream is low, and for a given velocity of gas (herein defined as the volumetric rate of gas to be disengaged per unit area of the liquid surface), the voidage increases significantly with decreasing slip velocity. Furthermore, in the absence of coalescence but where the bubbles of evolved gas rising through the liquid stream interact with one another so as to form a swarm of bubbles, the slip velocity of the swarm may be considerably lower than that of the individual bubbles. The slip velocity that gives rise to a given voidage is in turn determined, in part, by the size of the gas bubbles formed by the decomposition reaction, and is a function of the properties of the liquid stream, and of the conditions under which the reaction proceeds.

Preferably, for a given liquid stream, the voidage should not exceed a maximum value; therefore the velocity of the gas, during disengagement from the liquid surface, should preferably be less than than that which gives rise to the aforementioned maximum voidage. Consequently, it is possible to determine a minimum area per unit flowrate of the liquid stream over which it is advisable to disengage the gas. Hence the cross-sectional area of a reaction volume may be determined. This is particularly important in respect of the first reaction volume, wherein the maximum volume of gas is usually evolved. Subsequent reaction volumes may thus have equivalent surface areas to the first reaction volume.

The rate at which gas disengages from the liquid surface of each reaction volume is less than 0.05 $m^3.s^{-1}$ per $m^2$ of the liquid surface of that reaction volume. Hence the velocity (as defined above) of the gas disengaging from the free surface of the liquid of each reaction volume, is less than 5 $cm.s^{-1}$. In at least the first reaction volume, this gas velocity is preferably between 0.05 to 5 $cm.s^{-1}$, and particularly between 0.05 to 2 $cm.s^{-1}$.

Preferably in at least the first reaction volume, the liquid stream passes through the catalyst with a vertical velocity component and the cross sectional area of that reaction volume is such that said vertical component has a magnitude that is less than 20%, particularly less than 10%, of velocity of the gas disengaging from that reaction volume.

The gas evolved is preferably continuously disengaged from the liquid stream. To assist evolution of the gas, inserts may be provided within one or more of the reaction volumes to act as sites for the nucleation or coalescence of bubbles of evolved gas. The surfaces of such inserts may be corrugated to improve the nucleation or coalescent effect. Furthermore the inserts may also serve as channels along which the bubbles of gas are conducted so as to disengage from the liquid stream.

The free liquid surface in each reaction volume may be formed by controlling the amount of the liquid stream in each reaction volume such that the amount of the liquid stream in the reactor is not sufficient to occupy the full volume of the reactor: as a result the upper surface of the liquid stream within a reaction volume thus forms a liquid surface from which the gas can disengage. The level within the reactor may be maintained by one or more of a number of level control means either external and/or internal to the reactor.

In gravity fed systems sufficient hydraulic pressure is required to cause the liquid stream to flow through a reaction volume. In order to provide the required hydraulic pressure, the reactor may be sloped, with the liquid stream inlet to the reactor towards the top of the reactor.

The hydraulic pressure required to achieve a flow of the liquid stream through a bed of particulate catalyst may be of the order of 500 $N.m^{-2}$ per meter length of bed of particulate catalyst. In preferred forms of the invention, the particulate catalyst is disposed in a plurality of reaction volumes through which the liquid stream cascades under the influence of gravity. The reaction volumes are conveniently formed by using vertical baffles across the width of the reaction volume, and suitably such baffles may be in the form of a succession of under- and over-weirs.

For some gravity fed systems employing a particulate catalyst it is possible to derive an expression for the minimum slope required in order to cause the liquid stream to flow through the particulate catalyst. Thus for viscous flow conditions the following expression may be applied:

$$\tan(a) = K \cdot (Q_1 \cdot V^{-1}) \cdot L^{-1} [L^2 + (N \cdot d)^2]$$

where
- $a$ = angle of the slope to the horizontal [radians]
- $Q_1$ = volumetric flowrate of liquid stream [m³.s⁻¹]
- $V$ = total volume occupied by the particulate catalyst [m³]
- $L$ = overall length of the reactor [m]
- $d$ = average depth of the particulate catalyst in the reaction volumes [m]
- $N$ = number of reaction volumes [–]
- $K$ = constant [s.m⁻¹]

The term "viscous flow" relates to those conditions wherein the Reynolds number is less than 100, and in particular is less than 50. The Reynolds number, Re, is given by $$Re = v_l \cdot d_e \cdot o \cdot u^{-1} \cdot (1-e)^{-1}$$

where
- $v_l$ = superficial velocity of the liquid stream [m.s⁻¹]
- $d_e$ = particle equivalent diameter, and is equivalent to 6 times the volume occupied by a single particle divided by the external surface area of a single particle [m]
- $o$ = liquid density [kg.m⁻³]
- $u$ = viscosity of the liquid [Ns.m⁻²]
- $e$ = fractional volume of the bed occupied by solids The number of baffles required to generate N reaction volumes is N−1. The constant, K, may be estimated using the known theory of viscous flow of liquids through beds of particles, or preferably may be derived from data obtained by simple experimentation.

In processes where a liquid-borne reactant is catalytically decomposed with the evolution of a gas using a series of reaction volumes, each containing a catalyst bed, through which the liquid flows vertically in succession, the absolute rate, expressed as mol/h, at which the reaction occurs may decrease as the liquid flows through successive reaction volumes. Thus the amount of reactant decomposed in a given reaction volume at a given rate of flow through the reaction volume is proportional to the difference between the inlet concentration, $C_{in}$, and the outlet concentration, $C_{out}$, of the reactant in that reaction volume. For a first order, or pseudo first order, reaction such as the decomposition of hypochlorite ions, $$C_{in} - C_{out} = C_{in}(1 - e^{-kt})$$

where k is the first order rate constant at the prevailing temperature in the bed and t is the residence time in the catalyst bed. The volume of gas evolved is proportional to the amount of reactant decomposed. Since $C_{in}$ for a given bed equals $C_{out}$ for the previous bed, if the residence time in each bed is the same, it is seen that, if k and t are sufficiently large, the bulk of the reactant may be decomposed, and hence the bulk of the gas is evolved in the initial reaction volume or volumes. For example in a typical case of hypochlorite decomposition, each succeeding catalyst bed may typically reduce the hypochlorite concentration by a factor of 5–10, so that 50–90% of the hypochlorite is decomposed in the first bed. The consequent evolution of large amounts of gas in the initial beds could give rise to hydrodynamic instabilities as aforesaid.

It is therefore preferred that the beds are not operated with uniform residence times, but rather that at least the initial bed, or beds, employ shorter residence times than in subsequent beds. For a given overall liquid volumetric flow rate this may be achieved by ensuring that the depth of the catalyst bed in the initial reaction volumes is less than in subsequent reaction volumes. It is thus preferred that the depth of catalyst in at least the first reaction volume is less than the depth of catalyst in at least one subsequent reaction volume.

It will be appreciated that the depth of catalyst in each reaction volume need not be less than the depth in the immediately preceding reaction volume. Thus the reactor may contain a series of reaction volumes wherein the liquid flows alternately upwards and downwards in succeeding reaction volumes. In this case the depth of catalyst in each pair of downflow and upflow reaction volumes may be the approximately the same but is less than in the succeeding pair of downflow and upflow reaction volumes. It is preferred that there are at least two reaction volumes through which the liquid flows downwards and the depth of catalyst in one reaction volume through which the liquid flows downwards is less than that in a subsequent reaction volume through which the liquid flows downwards.

Since in later stages of the series of reaction volumes, the catalyst may be effecting essentially only a "polishing" operation, reducing the reactant concentration from an already low level to an even lower level, it will be appreciated that there will be far less gas evolved and the aforesaid hydraulic instability problems may not arise in relation to those reaction volumes. Accordingly the final reaction volume or volumes need not have a catalyst depth greater than those of preceding reaction volumes. Indeed, especially if the effluent from those preceding reaction volumes has a reactan concentration near to the desired level, the depth of catalyst required in the final reaction volume or volumes may be equal to or less than the catalyst depth in the initial reaction volume or volumes.

The present invention may be used under conditions in which the reaction volumes are heated or cooled by external means. Alternatively, the present invention may be used where the decomposition of the reactant proceeds under adiabatic reaction conditions.

Adiabatic reaction conditions may be chosen because of tile difficulty in providing heat transfer means so as to be able to either heat or cool the reaction volume, e.g. where the reaction conditions are corrosive.

Where adiabatic reaction conditions are employed, and the decomposition reaction is exothermic in nature, the temperature at which tile liquid stream enters the first reaction volume may be non optimal. Where it is desired to treat a feed stream having a temperature below the temperature at which the reaction becomes self-sustaining, the feed should be heated prior to entry into the reactor, or a heater is provided in the first reaction volume. It may be particularly advantageous to associate the present invention with a reactor in which an initial decomposition of part of the reactant in the feed stream is conducted under isothermal, adiabatic conditions. An isothermal, adiabatic reactor herein refers to a reactor within which a chemical reaction proceeds under adiabatic conditions at a uniform temperature; the uniform temperature being determined by the heat capacities of the reactant-containing and product-containing streams, the inlet temperature of the reactant-containing stream and the amount of energy released as a consequence of the chemical reaction. The isothermal, adiabatic, reactor preferably precedes the reactor of the present invention wherein the decomposition occurs under non-isothermal, adiabatic conditions. Thus, the reactor of the present invention uses as the influent stream the product from the isothermal, adiabatic reactor. The reaction volume of the isothermal, adiabatic, reactor is preferably chosen so as to minimise the total reaction volume required in order to achieve the desired overall extent of reaction. A particular form of isothermal adiabatic reactor that is well suited for use in combination with an adiabatic reactor of the present invention is a continuous stirred tank reactor hereinafter termed a CSTR.

An example of an exothermic reaction which is shown to benefit by the provision of a CSTR before an adiabatic reactor of the present invention is the first order reaction of the decomposition of sodium hypochlorite.

The optimum extent of reaction to perform in a CSTR, for an exothermic, first order reaction conducted under adiabatic conditions may be determined as follows:

The reaction rate can be expressed as:

$$R = k.(C - C_*)$$

wherein
R = reaction rate [kmol.m$^{-3}$.s$^{-1}$]
k = rate constant [s$^{-1}$]
C = concentration of the reactant in the CSTR [kmol.m$^{-3}$]
C$_*$ = equilibrium concentration of the reactant in the CSTR [kmol.m$^{-3}$]

An energy balance over the CSTR gives:

$$T = T_o + H.C_p^{-1}.(C_o - C)$$

wherein
H = heat of reaction [J.kmol$^{-1}$]
C$_p$ = heat capacity of the liquid reactant [J.m$^{-3}$.K$^{-1}$]
C$_o$ = inlet concentration of the reactant [kmol.m$^{-3}$]
T$_o$ = inlet temperature of the reactant [K]
T = temperature of the reactant in the CSTR [K]

The parameters k and C$_*$ may be represented by simple Arrhenius expressions, $A.e^{-a/T}$, and $B.e^{-b/T}$ respectively. Conveniently the following substitutions may also be made:

$$y = C_p.H^{-1}$$

$$\theta = T_o + C_o.y^{-1}$$

The temperature at which the maximum rate of reaction occurs, and at which the minimum reaction volume of reactor is obtained, is then given by solving the following expression:

$$A.T^{-2}.e^{-a/T}.[y.(a.\theta - a.T - T^2) - b.(a + b).e^{-b/T}] = 0$$

For some reactions this equation can be simplified. Thus where the equilibrium concentration of the reactant is very low, i.e. the reaction can go to completion, the equation simplifies to:

$$T^2 + a.T - a.\theta = 0$$

Where no such simplification can be done, iterative methods can be employed to solve the equation.

Solution of this equation enables he optimum exit concentration of the reactant can be CSTR to be determined. Using the exit concentration so determined, it is then possible using known techniques to determine the volume of both the CSTR and the reactor of the present invention that would enable the desired extent of reaction to be achieved.

A further advantage of the present invention, is that the gas, rising through the liquid stream, may be used more efficiently to effect or to enhance, at least partial, removal of an other component from the liquid stream. Thus the gas may be reactive with the other component, e.g. an oxidising agent such as oxygen. Thus, as the gas rises through the liquid stream the gas reacts with the other component.

Alternatively, the gas rising through the liquid stream may physically absorb the other component from the liquid stream. The other component is thus "stripped" from the liquid stream.

Stripping of the other component from the liquid stream is particularly effective where the other component is more volatile than the remainder of the liquid stream. For example, the reactor of the present invention may be used to decompose hypochlorite ions present in an aqueous stream, thereby forming gaseous oxygen. The other component, when in the form of a volatile hydrocarbon, such as chloroform or carbon tetrachloride, may be removed, simultaneously with the decomposition of the hypochlorite and the disengagement of the oxygen, from the aqueous stream.

BRIEF DESCRIPTION OF THE DRAWINGS

The apparatus of the present invention may be illustrated by reference to the accompanying drawings.

Figure 1:
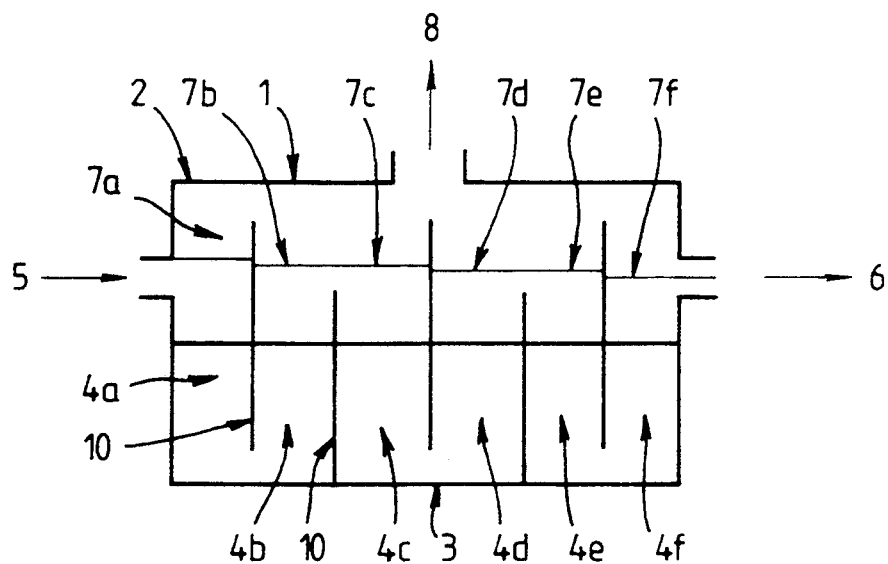
FIG. 1 shows a cross-sectioned elevation through a reactor employing a particulate catalyst showing the positioning of flow direction control means in the form of vertical baffles.

The reactor system represented in FIG. 1 shows a reactor 1, having a top 2, a base 3, and reaction volumes 4a, 4b, 4c, 4d, 4e and 4f which contain particulate catalyst capable of catalysing the decomposition reaction and in which the reaction occurs. The reactor 1 is further provided with an influent liquid stream inlet 5, through which the liquid stream flows into the reactor 1, and a liquid effluent stream exit 6, through which the liquid effluent stream is released from the reactor 1. Within the reactor 1, the liquid stream forms free surfaces 7a, 7b, 7c, 7d, 7e and 7f, from which the gas disengages. An outlet 8 is provided through which the disengaged gas is vented.

Successive reaction volumes are separated by a series of vertical baffles 10. Each of the series of vertical baffles 10 extends across the width of the reaction volume, however the top edges of alternate baffles in the series are raised above and submerged below the free surface of the liquid stream. Those baffles in the series which have top edges raised above the free surface of the liquid stream do not fully extend to the base of the reactor 3, and are termed under-weirs. Those other baffles in the series are termed over-weirs.

Figure 2:
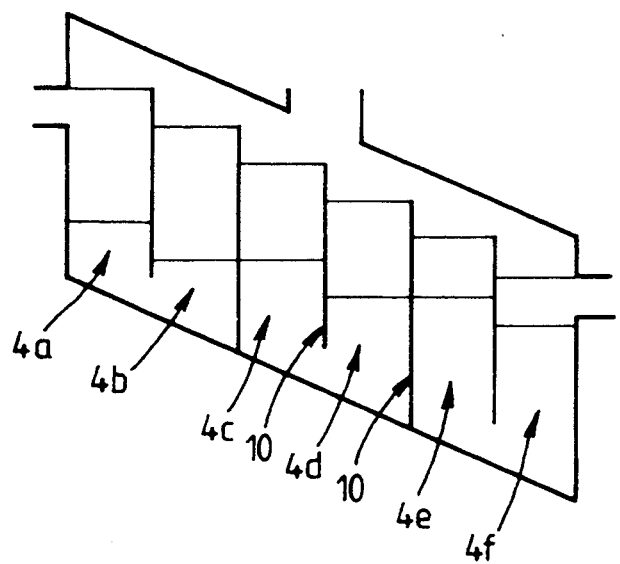
FIG. 2 shows a gravity fed reactor employing a particulate catalyst.

FIG. 2 shows a reactor at an angle to the horizontal so as to provide sufficient hydraulic pressure to overcome the pressure drop of the liquid stream flowing through the particulate catalyst. The reactor again provides a number of reaction volumes 4a, 4b, 4c, 4d, 4e and 4f, separated by a series of vertical baffles 10. As mentioned above it is preferred that the beds are not operated with uniform residence times, but rather that at least the initial bed, or beds, employ shorter residence times than in subsequent beds, and this may be achieved by ensuring that the depth of the catalyst bed in the initial reaction volumes is less than in subsequent reaction volumes. This is shown in FIG. 2 where the catalyst beds of reaction volumes 4e and 4f are deeper than the beds of reaction volumes 4c and 4d which in turn are deeper than beds of reaction volumes 4a and 4b. Also as indicated above, the depth of catalyst in each reaction volume need not be less than the depth in the immediately preceding reaction volume. This is shown in FIG. 2 where the reactor contains a series of reaction volumes wherein the liquid flows alternately upwards and downwards in succeeding reaction volumes; the depth of catalyst in each pair of downflow and upflow reaction volumes is shown to be the approximately the same but is less than in the succeeding pair of downflow and upflow reaction volumes.

Figure 3:
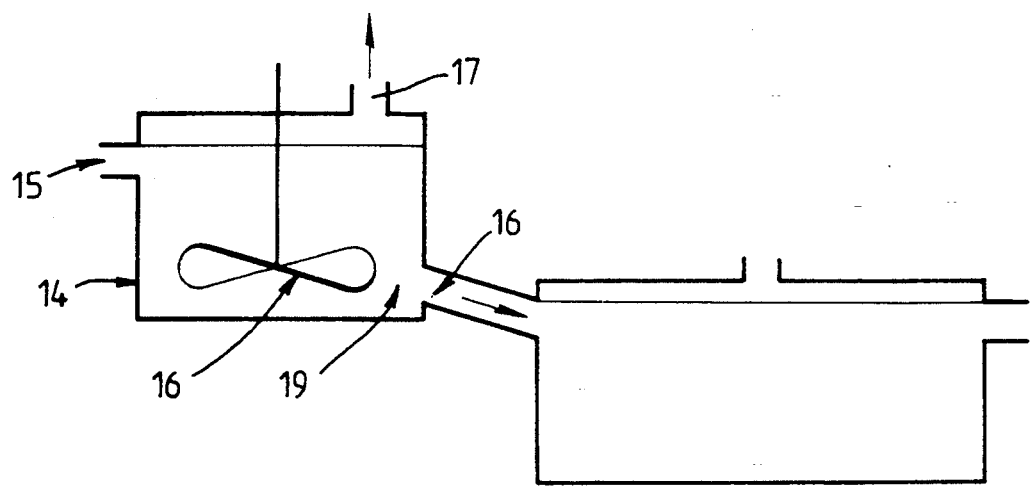
FIG. 3 shows a CSTR preceding a reactor of the type shown in FIG. 1.

FIG. 3 shows a CSTR 14 preceding a reactor of the present invention, the internal details of which have been omitted. The CSTR 14, has a liquid stream inlet 15, a liquid outlet 16, and a gas outlet 17. The CSTR 14 is also provided with an agitator 18 to ensure that the contents of the reaction volume 19 are well mixed. The liquid outlet 16 leads to a reactor of the present invention. Thus, in use the liquid stream enters the CSTR 14, wherein the reactant decomposes such that a first extent of reaction is achieved. This first extent of reaction being less than the overall extent of reaction desired. The gas evolved in the CSTR 14 is vented through the gas outlet 17. A liquid stream containing a reduced concentration of reactant then flows from the CSTR 14 through liquid outlet 16 into the reactor of the present invention wherein it forms the influent stream and further reaction of the reactant occurs until the overall extent of reaction is achieved. As stated herein before, it may be possible to minimise the reaction volume required for a given desired extent of reaction if a CSTR 14 is combined in series with a reactor of the present invention with the volume of the CSTR 14 being determined as described above.

Figure 4:
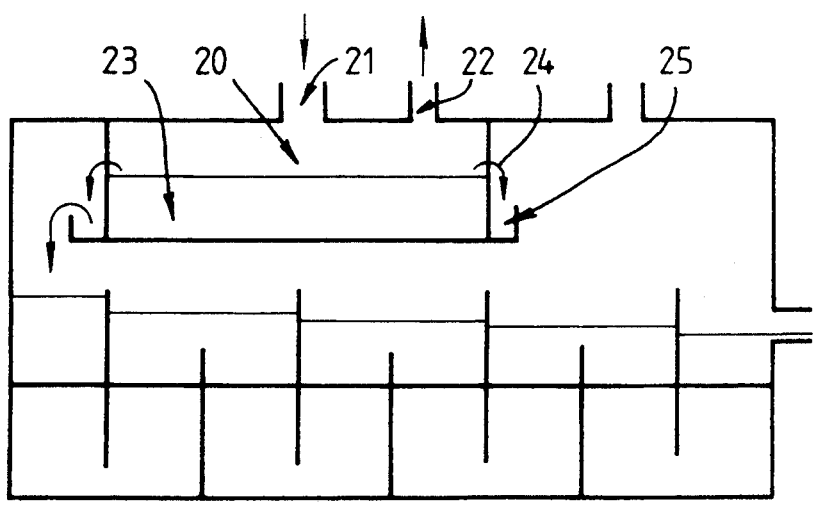
FIG. 4 shows a CSTR preceding a reactor of the type shown in FIG. 1.

FIG. 4 shows a CSTR 20 preceding a reactor of the present invention. The CSTR 20 has a liquid stream inlet 21, and a gas outlet 22. The reaction volume 23 contains a particulate catalyst capable of catalysing the decomposition of the reactant. Mixing within the reaction volume 23 of the CSTR 20 is achieved using the turbulence produced as a result of evolving a large amount of gas per unit volume of liquid stream in a vigorous reaction. A liquid stream containing a reduced concentration of reactant overflows from the reaction volume 23 via weir 24 into a gutter 25 from where it is directed into the reactor of the present invention.

The process of the present invention may be illustrated by reference to the following examples.

EXAMPLES 1–5

A reactor comprising four reaction volumes in series was constructed. The first two reaction volumes were separated by means of an under weir, as were the third and fourth reaction volumes. The second and third reaction volumes were separated by means of an over weir. The reaction volumes were arranged so that an influent stream fed to the top of the first reaction volume could flow through the series of reaction volumes under the effect of gravity and the effluent stream was taken from the top of the fourth reaction volume.

Each reaction volume was 146 mm wide, 141 mm long, and contained a particulate catalyst. The depth of catalyst in the reaction volumes was as follows:

| | |
|---|---|
| Reaction volume 1 | 96 mm |
| Reaction volume 2 | 88 mm |
| Reaction volume 3 | 80 mm |
| Reaction volume 4 | 87 mm |

The total volume of catalyst employed was thus about 7.24 l. The catalyst employed was "Extrudates A" of Example 1 of EP-A-397342.

An aqueous influent stream of sodium hypochlorite of measured concentration was fed to top of the first reaction volume at atmospheric pressure and at about 20° C. and the concentration of sodium hypochlorite in time effluent from the fourth reaction volume was measured. The experiment was repeated using different influent concentrations of sodium hypochlorite and different space velocities.

In time following Table 1, the measured outlet concentration was compared with the theoretical maximum and minimum outlet concentrations. The theoretical minimum outlet concentration is calculated on the assumption that there is no back-mixing in any of the reaction volumes, while the theoretical maximum outlet concentration assumes complete back-mixing in each reaction volume, but no back mixing of the effluent of a reaction volume with the influent of a preceding reaction volume. The minimum and maximum outlet concentrations were determined from the reaction rate equation $$C_{out} = C_{in} e^{-kt}$$

where t is the time in the reaction volumes and k is the rate constant determined according to the equation $$k = A.e^{-a/T}$$

where T is the measured temperature (expressed in °K.) and using values of $A = 1.2 \times 10^4$ and $a = 5000$ determined experimentally for the catalyst.

TABLE 1

| Example | Time from start (h) | Space velocity (h$^{-1}$) | Average reactor temp (°K.) | Reactant concentration inlet (g.l$^{-1}$) | outlet (ppm) Found | Min | Max |
|---|---|---|---|---|---|---|---|
| 1 | 4.5 | 0.75 | 314 | 111.3 | 426 | 102 | 1948 |
|   | 7.5 | 0.75 | 315 | 111.3 | 206 | 71 | 1711 |
|   | 9.5 | 0.75 | 316 | 111.3 | 150 | 48 | 1501 |
| 2 | 2.0 | 0.5 | 303 | 99.4 | 1200 | 276 | 2662 |

TABLE 1-continued

| Example | Time from start (h) | Space velocity (h$^{-1}$) | Average reactor temp (°K.) | Reactant concentration inlet (g.l$^{-1}$) | Reactant concentration outlet (ppm) Found | Reactant concentration outlet (ppm) Min | Reactant concentration outlet (ppm) Max |
|---|---|---|---|---|---|---|---|
|  | 2.75 | 0.5 | 304 | 99.4 | 780 | 199 | 2336 |
|  | 3.25 | 0.5 | 305 | 99.4 | 434 | 141 | 2046 |
|  | 4.0 | 0.5 | 303 | 99.4 | 340 | 98 | 1789 |
| 3 | 3.0 | 0.5 | 313 | 94.2 | 123 | 4 | 632 |
|  | 5.5 | 0.5 | 313 | 94.2 | 72 | 4 | 632 |
|  | 7.0 | 0.5 | 313 | 94.2 | 57 | 4 | 632 |
|  | 9.0 | 0.5 | 312 | 94.2 | 17 | 7 | 731 |
| 4 | 1.0 | 0.5 | 307 | 104.7 | 592 | 71 | 1644 |
|  | 3.0 | 0.5 | 312 | 104.7 | 136 | 8 | 813 |
|  | 6.0 | 0.5 | 313 | 104.7 | 66 | 5 | 703 |
| 5 | 3.5 | 0.5 | 313 | 101.1 | 140 | 5 | 679 |
|  | 7.0 | 0.5 | 313 | 101.1 | 90 | 5 | 679 |
|  | 9.25 | 0.5 | 312 | 101.1 | 74 | 8 | 785 |

Variation of the "Found", i.e. achieved, outlet concentrations, with time, may be attributed to the gradual achieving of steady state conditions within the reactor.

Variations with time of the theoretically calculated outlet concentrations may be attributed to the slight changes in temperature.

It can thus be seen that the process and reactor of the present invention can achieve reductions in the outlet concentration of hypochlorite, approaching that of the theoretical optimum performance reactor.

In the above examples, the sodium hypochlorite content of the effluent from the first reaction volume was also monitored, and from the average value over the period of that example, the rate, Vg, of gas evolution from the first reaction volume was calculated. From Vg and the cross sectional area of the first reaction volume (about 0.021 m$^2$), the parameter Gr, viz the rate of gas evolution per unit liquid surface area for the first reaction volume was computed (Gr thus has the dimensions of a velocity, m.s$^{-1}$). From the volumetric liquid flow rate, Vl, and the cross sectional area of the first reaction volume, the liquid vertical velocity, Lv, was also computed. These values, together with the dimensionless ratios Vg/Vl and Lv/Gr, are shown in Table 2.

TABLE 2

| Example No | Vl (m$^3$/s) × 10$^6$ | Vg (m$^3$/s) × 10$^5$ | Gr (m/s) × 10$^3$ | Lv (m/s) × 10$^5$ | Vg/Vl | Lv/Gr × 10$^2$ |
|---|---|---|---|---|---|---|
| 1 | 1.5 | 2.82 | 1.4 | 7.3 | 18.8 | 5.3 |
| 2 | 1.0 | 1.71 | 0.8 | 4.9 | 17.1 | 5.9 |
| 3 | 1.0 | 1.61 | 0.8 | 4.9 | 16.1 | 6.2 |
| 4 | 1.0 | 1.79 | 0.9 | 4.9 | 17.9 | 5.6 |
| 5 | 1.0 | 1.73 | 0.8 | 4.9 | 17.3 | 5.8 |

The hypochlorite used in Examples 1 to 5 is intended to represent a contaminant of an effluent stream from, for example, a chlorine manufacturing process, or a magnesium refining process. In such processes the object of the process is to achieve as low a concentration of hypochlorite, in the discharged effluent, as possible for a given total catalyst volume.

EXAMPLE 6

Using the above experimentally determined values "A" and "a" for the rate constant equation, it is calculated by solution of the aforementioned CSTR equations that if it is desired to effect essentially complete decomposition of sodium hypochlorite in a feedstock at a temperature of 20° C. containing 15.8% w/w of sodium hypochlorite, desirably the process of the invention is preceded by treating the feedstock in a CSTR designed to give an effluent from the CSTR containing about 8.07% w/w of sodium hypochlorite. It is calculated that the effluent from the CSTR would have a temperature of 58.6° C. Thus about 51% of the total reaction is desirably effected in the CSTR and the remaining 49% by the process of the invention. The volume of catalyst in the reactor of the present invention should thus be sufficient to allow reaction of the remaining 49%, i.e. reducing the concentration of sodium hypochlorite from 8.07% w/w to essentially zero. Decomposition of such an influent stream containing 8.07% w/w of sodium hypochlorite will release about 12 liters of oxygen per liter of the influent stream.

We claim:

1. A process for the continuous catalytic decomposition of hypochlorite ions in an aqueous influent, comprising establishing continuous flow of an aqueous medium containing hypochlorite ions through a plurality of serially connected reaction volumes each containing a bed of particulate catalyst effective to cause decomposition of hypochlorite ions with the evolution of gas, thereby effecting said decomposition with the evolution of gas in said reaction volumes each of which has an upper liquid surface from which said evolved gas disengages, and continuously feeding said influent to an inlet of the first of said reaction volumes and discharging from an outlet of the last of the reaction volumes an aqueous effluent having, as a result of the decomposition occurring in said reaction volumes, a decreased quantity of hypochlorite ions, the influent being fed to said inlet of the first reaction volume at such a rate that the volumetric flow rate of the influent divided by the total volume of catalyst in all said reaction volumes is in the range 0.02 to 10 hr$^{-1}$, and the concentrations of hypochlorite ions in said influent and effluent being such that at least 0.5 volumes of gas are evolved for each volume of influent fed to the process, and the amount of decomposition occurring in each reaction volume being such that the gas disengages from said upper liquid surface of that reaction volume at a rate that is less than 0.05 m$^3$.s$^{-1}$ per m$^2$ of said upper liquid surface of that reaction volume, said reaction volumes being disposed so that said aqueous medium flows downwards through the catalyst bed in at least one of the reaction volumes counter-current to the evolution of gas.

2. A process as claimed in claim 1 wherein said particulate catalyst is disposed in at least four reacting volumes.

3. A process as claimed in claim 1 wherein the depth of the catalyst bed in the first reaction volume is such that the gas disengagement rate is from 0.0005 to less than 0.05 m$^3$.s$^{-1}$ per m$^2$ of the upper liquid surface of that reaction volume.

4. A process as claimed in claim 1 wherein an aqueous feed stream containing hypochlorite ions is reacted under isothermal, adiabatic, conditions to produce a partially reacted stream having a decreased concentration of hypochlorite ions, and said partially reacted stream is employed as at least part of said influent.

5. A process as claimed in claim 1 wherein the depth of catalyst in the first reaction volume is less than the depth of catalyst in at least one subsequent reaction volume.

6. A process as claimed in claim 1 wherein said plurality of reaction volumes includes at least two volumes through which the aqueous medium flows downwards and wherein the depth of particulate catalyst in one reaction volume through which the liquid flows downwards is less than that in a subsequent reaction volume through which the aqueous medium flows downwards.

7. A process as claimed in claim 1 wherein the aqueous medium flows through the catalyst bed of at least the first reaction volume downwards counter-current to the evolution of gas.

8. A process as claimed in claim 1 wherein the vertical velocity of the aqueous medium flowing through the catalyst bed of the first reaction volume has a magnitude that is less than 20% of the velocity of the gas disengaging from the upper surface of that reaction volume.

9. A process as claimed in claim 1 wherein the aqueous medium flows through the catalyst beds of at least two reaction volumes downwards counter-current to the evolution of gas.

* * * * *

UNITED STATES PATENT AND TRADEMARK OFFICE
CERTIFICATE OF CORRECTION

PATENT NO.  :   5,387,349
DATED       :   February 7, 1995
INVENTOR(S) :   TROTTER et al.

It is certified that error appears in the above-identified patent and that said Letters Patent is hereby corrected as shown below:

On the title page,   insert:

-- Related U.S. Application Data

[63] Continuation of Ser. No. 683,316, April 10, 1990, abandoned. --

Signed and Sealed this

Eighth Day of August, 1995

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,387,349
DATED : February 7, 1995
INVENTOR(S) : Trotter et al.

It is certified that error appears in the above-identified patent and that said Letters Patent is hereby corrected as shown below:

On the title page, following,

"[22] Filed: October 26, 1992"

insert:

-- Related U.S. Application Data

[63] Continuation of Ser. No. 683,316, April 10, 1991, abandoned.--

Signed and Sealed this

Fourth Day of May, 1999

Attest:

Attesting Officer

Q. TODD DICKINSON

Acting Commissioner of Patents and Trademarks